(12) United States Patent
Nakashima

(10) Patent No.: US 10,821,544 B2
(45) Date of Patent: Nov. 3, 2020

(54) LASER WELDING METHOD AND LASER WELDING DEVICE

(71) Applicant: TOYOTA JIDOSHA KABUSHIKI KAISHA, Toyota (JP)

(72) Inventor: Satoshi Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 15/845,034

(22) Filed: Dec. 18, 2017

(65) Prior Publication Data

US 2018/0178321 A1 Jun. 28, 2018

(30) Foreign Application Priority Data

Dec. 22, 2016 (JP) ................................. 2016-250029

(51) Int. Cl.
*B23K 26/03* (2006.01)
*B23K 26/04* (2014.01)
(Continued)

(52) U.S. Cl.
CPC ........ *B23K 26/032* (2013.01); *B23K 15/0046* (2013.01); *B23K 26/043* (2013.01);
(Continued)

(58) Field of Classification Search
CPC .... B23K 26/0876; B23K 26/21; B23K 26/24; B23K 26/60; B23K 26/0613;
(Continued)

(56) References Cited

U.S. PATENT DOCUMENTS 4,501,950 A * 2/1985 Richardson .......... B23Q 35/128
219/124.34
8,378,255 B2 * 2/2013 Nagashima .......... B23K 26/073
219/121.64
(Continued)

FOREIGN PATENT DOCUMENTS

CN 103182604 A 7/2013
JP 59-76689 A 5/1984
(Continued)

OTHER PUBLICATIONS

Joon-Sik Park et al., "Effect of Laser Welding Variables on the Formability of Si Added Steel Welds", Journal of KWS, Korean Welding and Joining Society, vol. 24, Aug. 2006, pp. 299-305 (pp. 15-21) (6 pages total).
(Continued)

*Primary Examiner* — Frederick C Nicolas
(74) *Attorney, Agent, or Firm* — Sughrue Mion, PLLC

(57) ABSTRACT

A laser welding method includes preliminarily heating an entire welding path by irradiating the entire welding path with a heating laser beam for a first predetermined time, the welding path being closed loop-shaped and formed at a boundary between two workpieces as welding objects, and performing scanning with a welding laser beam along the welding path while continuously performing the irradiation with the heating laser beam after the preliminary heating and terminating the irradiation with the welding laser beam after the welding laser beam goes around the welding path.

6 Claims, 6 Drawing Sheets

(51) Int. Cl.

| | | |
|---|---|---|
| *B23K 26/06* | (2014.01) | |
| *B23K 26/21* | (2014.01) | |
| *B23K 15/00* | (2006.01) | |
| *B23K 26/24* | (2014.01) | |
| *B23K 26/067* | (2006.01) | |
| *B23K 26/60* | (2014.01) | |
| *B23K 101/36* | (2006.01) | |
| *B23K 103/10* | (2006.01) | |
| *H01M 2/04* | (2006.01) | |
| *H01M 2/02* | (2006.01) | |
| *H01M 10/04* | (2006.01) | |
| *B23K 26/70* | (2014.01) | |

(52) U.S. Cl.
CPC ...... *B23K 26/0613* (2013.01); *B23K 26/0648* (2013.01); *B23K 26/0676* (2013.01); *B23K 26/21* (2015.10); *B23K 26/24* (2013.01); *B23K 26/60* (2015.10); *B23K 26/702* (2015.10); *B23K 2101/36* (2018.08); *B23K 2103/10* (2018.08); *H01M 2/02* (2013.01); *H01M 2/0426* (2013.01); *H01M 10/04* (2013.01)

(58) Field of Classification Search
CPC ............. B23K 26/0648; B23K 26/043; B23K 26/032; B23K 15/0046; B23K 26/0676; B23K 2101/36; B23K 2103/10; B23K 26/702; H01M 2/0426; H01M 2/02; H01M 10/04

See application file for complete search history.

(56) References Cited

U.S. PATENT DOCUMENTS

| | | | |
|---|---|---|---|
| 8,766,140 B2* | 7/2014 | Denney | B23K 9/025 |
| | | | 219/136 |
| 9,314,876 B2* | 4/2016 | Lee | B23K 26/0823 |
| 9,527,166 B2* | 12/2016 | Kobayashi | B23K 26/032 |
| 9,757,817 B2* | 9/2017 | Webster | G01B 11/2441 |
| 2006/0255019 A1* | 11/2006 | Martukanitz | B23K 26/0648 |
| | | | 219/121.64 |
| 2007/0221638 A1* | 9/2007 | Yoshikawa | B23K 26/0884 |
| | | | 219/121.63 |
| 2013/0087534 A1* | 4/2013 | Denney | B23K 9/025 |
| | | | 219/121.14 |
| 2013/0168371 A1* | 7/2013 | Furusako | B23K 26/22 |
| | | | 219/121.64 |
| 2015/0360320 A1 | 12/2015 | Yoshida et al. | |
| 2016/0045985 A1* | 2/2016 | Kobayashi | B23K 26/032 |
| | | | 356/237.2 |
| 2016/0061727 A1* | 3/2016 | Kobayashi | G01N 21/55 |
| | | | 356/445 |
| 2016/0067832 A1* | 3/2016 | Kobayashi | B23K 26/032 |
| | | | 219/121.83 |

FOREIGN PATENT DOCUMENTS

| | | |
|---|---|---|
| JP | 2004337881 A | 12/2004 |
| JP | 2009-245758 A | 10/2009 |
| JP | 2016-002562 A | 1/2016 |

OTHER PUBLICATIONS

Partial Translation of Communication dated Mar. 21, 2019, from the Korean Intellectual Property Office in counterpart application No. 10-2017-0175050.

* cited by examiner

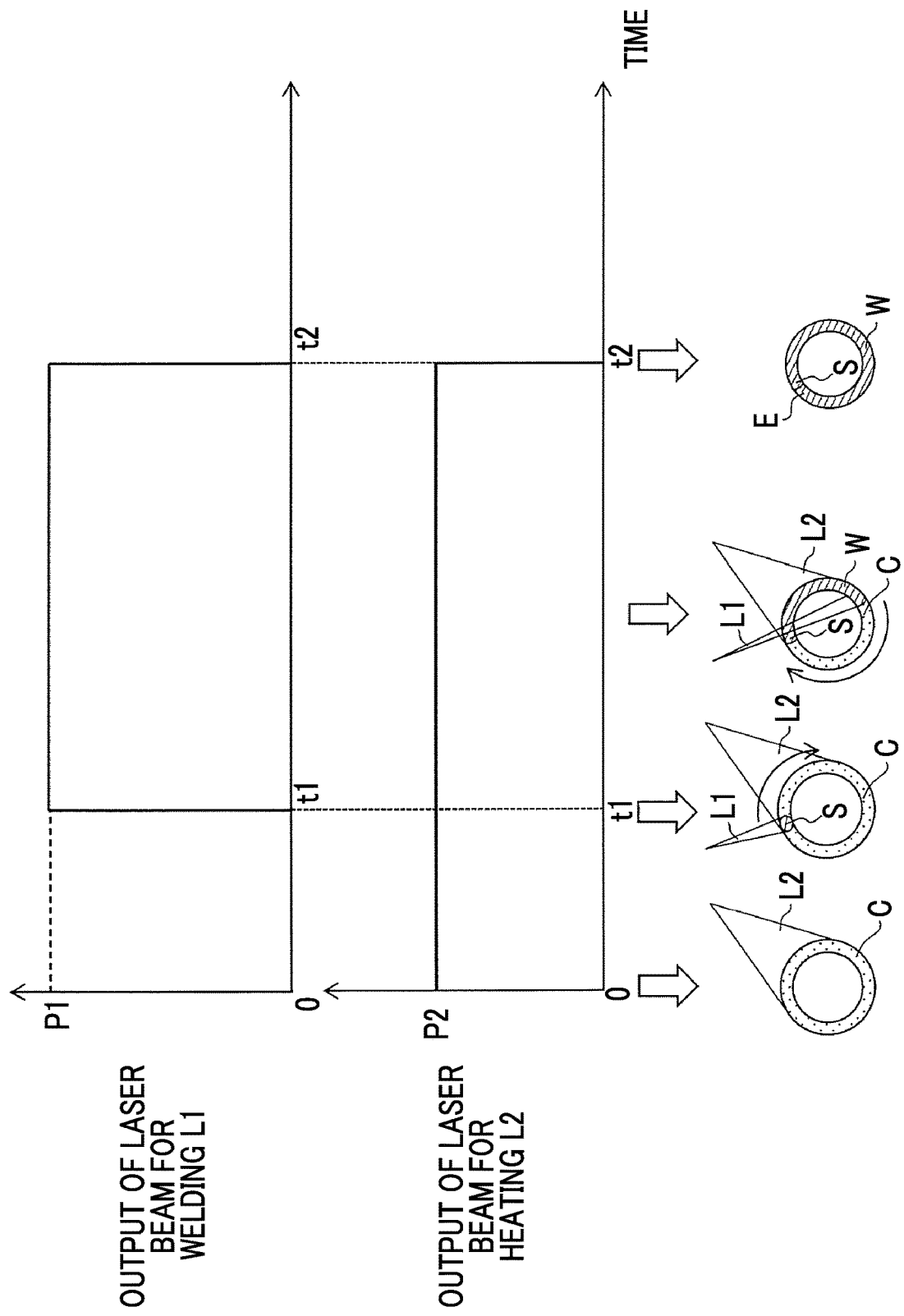

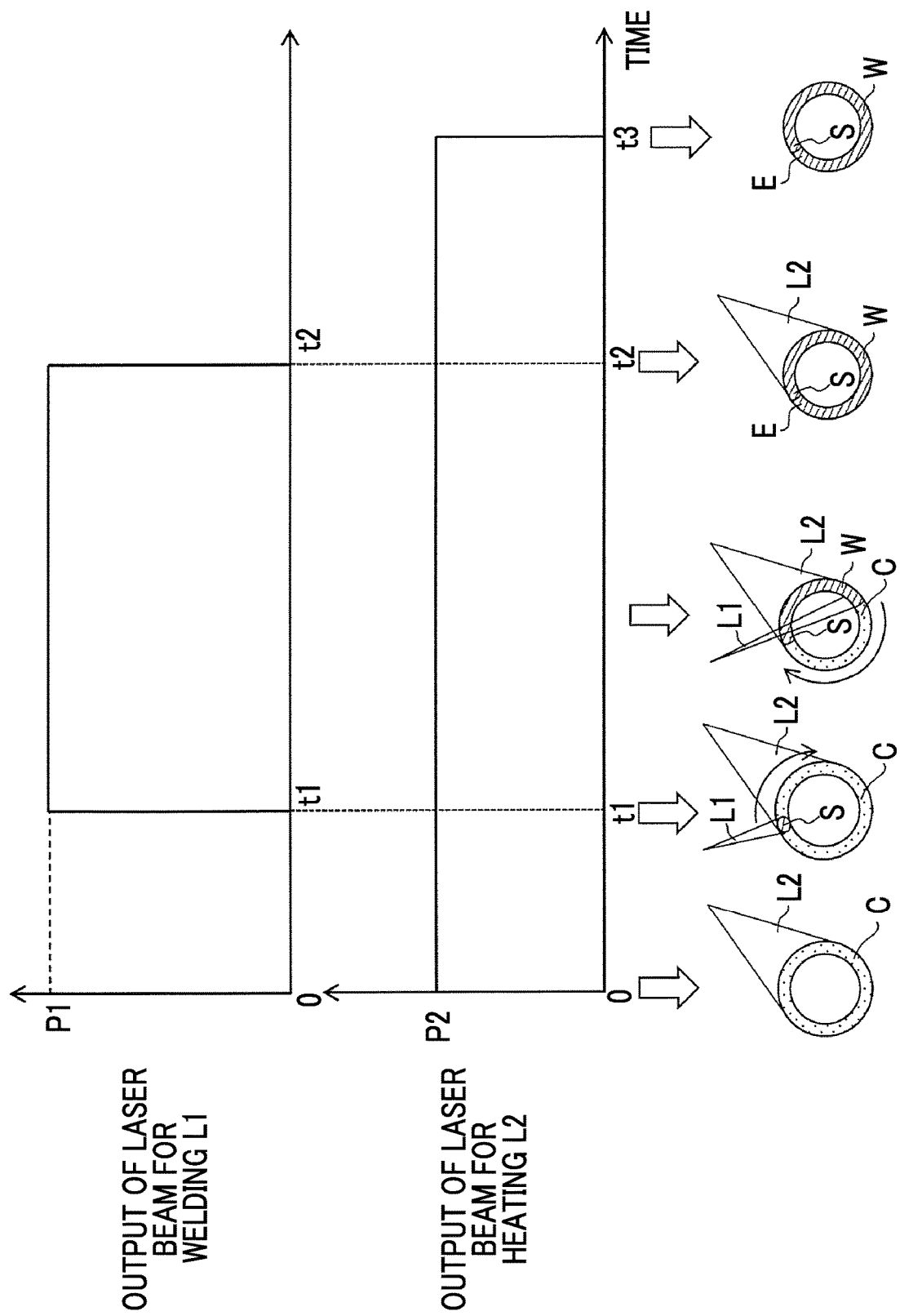

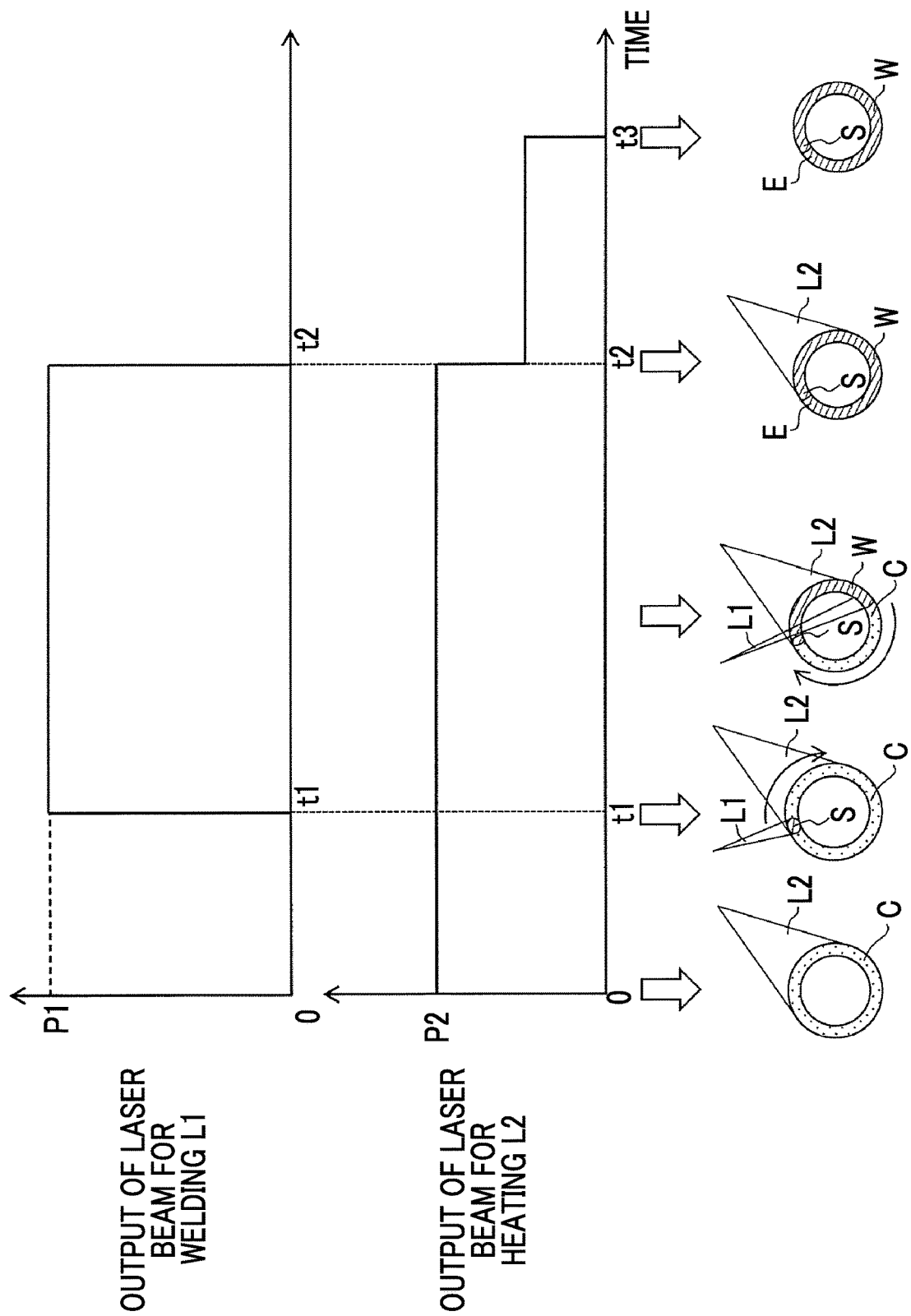

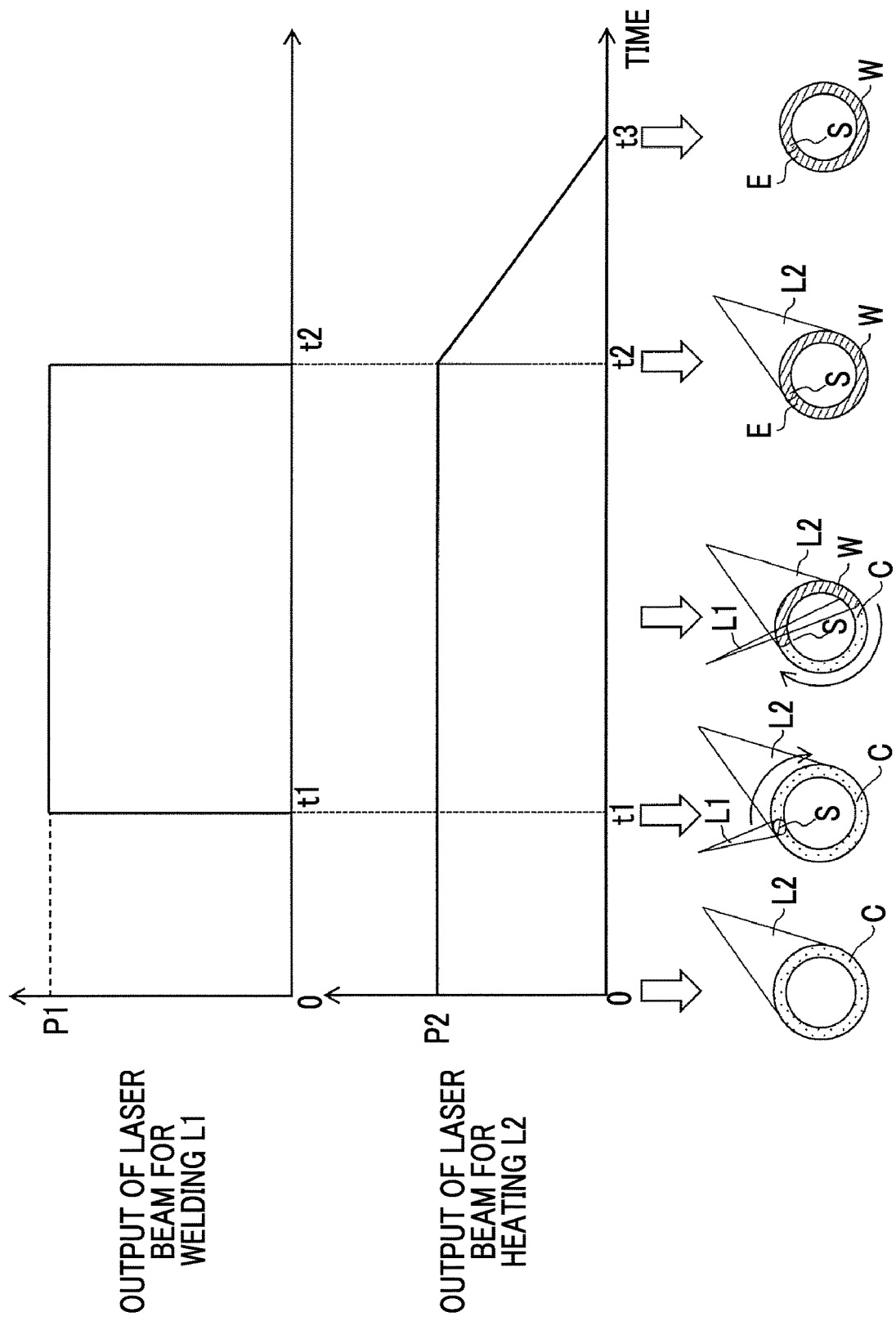

LASER WELDING METHOD AND LASER WELDING DEVICE

INCORPORATION BY REFERENCE

The disclosure of Japanese Patent Application No. 2016-250029 filed on Dec. 22, 2016 including the specification, drawings and abstract is incorporated herein by reference in its entirety.

BACKGROUND

1. Technical Field

The present disclosure relates to a laser welding method and a laser welding device for welding two workpieces to each other by emitting a welding laser beam.

2. Description of Related Art

Welding between two workpieces by emission of a welding laser beam during the welding between the two workpieces is disclosed in the related art. For example, Japanese Unexamined Patent Application Publication No. 2016-2562 (JP 2016-2562 A) discloses a laser welding method and a laser welding device for welding two workpieces to each other by performing scanning with a welding laser beam along a welding path formed at the boundary between the workpieces such that the welding laser beam goes around the welding path formed in a closed loop shape.

SUMMARY

According to the laser welding method disclosed in JP 2016-2562 A, the scanning with the laser beam is performed along the welding path, and thus heat input from the laser beam to the workpieces results in heat transfer to an unwelded part along the welding path. As a result, the temperatures of the workpieces at the unwelded part tend to rise. Accordingly, the penetration depth of a welding termination part may become deeper than the penetration depth of a welding initiation part, and then the welded part is unlikely to be stable. Accordingly, the output of the laser beam is frequently adjusted for the welding path to be uniform in penetration depth.

The disclosure provides a laser welding method and a laser welding device for allowing the uniformity of the penetration depth of a welded part to be increased even without complex output control being performed on a welding laser beam.

A first aspect relates to a laser welding method including preliminarily heating an entire welding path by irradiating the entire welding path with a heating laser beam for a first predetermined time, the welding path being closed loop-shaped and formed at a boundary between two workpieces as welding objects, and performing scanning with a welding laser beam along the welding path while continuously performing the irradiation with the heating laser beam after the preliminary heating and terminating the irradiation with the welding laser beam after the welding laser beam goes around the welding path.

According to the first aspect, the entire welding path is preliminarily heated first by the entire welding path being irradiated with the heating laser beam for the first predetermined time, the welding path being closed loop-shaped and formed at the boundary between the two workpieces as the welding objects. Then, the irradiation of the entire welding path with the heating laser beam is continuously performed even during the irradiation with the welding laser beam, and thus a state where the entire welding path of the workpieces is heated can be maintained. As a result, the scanning with the welding laser beam can be performed along the heated welding path and the two workpieces can be welded to each other even without complex output control being performed on the welding laser beam and at a state of a lower output than in a case where the heating laser beam is not emitted. As a result, the temperature difference between a welding initiation part and a welding termination part can be further reduced and the uniformity of the penetration depth of the welded part formed at the workpieces along the welding path can be increased.

The laser welding method according to the first aspect may further include terminating the irradiation with the heating laser beam and terminating the irradiation with the welding laser beam at the same time.

The laser welding method according to the first aspect may further include continuously emitting the heating laser beam for a second predetermined time after the irradiation with the welding laser beam is terminated.

In the laser welding method according to the first aspect, an output of the heating laser beam continuously emitted after the irradiation with the welding laser beam is terminated may be decreased.

In the laser welding method according to the first aspect, the output of the heating laser beam continuously emitted after the irradiation with the welding laser beam is terminated may be decreased by a constant output with respect to an output of the heating laser beam emitted before the irradiation with the welding laser beam is terminated.

In the laser welding method according to the first aspect, the output of the heating laser beam continuously emitted after the irradiation with the welding laser beam is terminated may be decreased at a predetermined constant rate of decrease with respect to an output of the heating laser beam emitted before the irradiation with the welding laser beam is terminated.

A second aspect relates to a laser welding device including a first irradiation unit configured to emit a welding laser beam along a closed loop-shaped welding path formed at a boundary between two workpieces as welding objects, a second irradiation unit configured to irradiate the entire welding path with a heating laser beam such that the entire welding path is heated, and a controller configured to control the first irradiation unit and the second irradiation unit. The controller is configured to control the second irradiation unit such that the entire welding path is irradiated with the heating laser beam for a first predetermined time and then control the first irradiation unit, while controlling the second irradiation unit such that the irradiation with the heating laser beam continues, such that scanning with the welding laser beam is performed along the welding path and the irradiation with the welding laser beam is terminated after the welding laser beam goes along the welding path.

According to the second aspect, the controller is configured to control the second irradiation unit such that the entire welding path is irradiated with the heating laser beam for the first predetermined time. Accordingly, the entire welding path can be preliminarily heated by the heating laser beam. The controller is configured to control the second irradiation unit such that the irradiation with the heating laser beam is continuously performed even during the welding by the welding laser beam after the preliminary heating. Accordingly, a state where the entire welding path of the workpieces is heated can be maintained. As a result, the controller is capable of allowing the scanning with the welding laser beam to be performed along the heated welding path and the two workpieces to be welded to each other even without complex output control being performed on the welding laser beam with respect to the first irradiation unit and at a state of a lower output than in a case where the heating laser beam is not emitted. As a result, the temperature difference between a welding initiation part and a welding termination part can be further reduced and the uniformity of the penetration depth of the welded part formed at the workpieces along the welding path can be increased.

In the laser welding device according to the second aspect, the controller may be configured to terminate the irradiation with the heating laser beam and terminate the irradiation with the welding laser beam at the same time.

In the laser welding device according to the second aspect, the controller may be configured to control the second irradiation unit such that the heating laser beam is continuously emitted for a second predetermined time after the irradiation with the welding laser beam is terminated.

In the laser welding device according to the second aspect, the controller may be configured to control the second irradiation unit such that an output of the heating laser beam continuously emitted after the irradiation with the welding laser beam is terminated is decreased.

According to the aspects, the uniformity of the penetration depth of the welded part can be increased even without complex output control being performed on the welding laser beam.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a timing chart for showing a method for welding by the laser welding device according to the first embodiment;

FIG. 5 is a timing chart for showing a method for welding by a laser welding device according to a second embodiment;

FIG. 6 is a timing chart for showing a method for welding by a laser welding device according to a third embodiment; and FIG. 7 is a timing chart for showing a method for welding by the laser welding device according to a modification example of the third embodiment.

DETAILED DESCRIPTION OF EMBODIMENTS

Figure 1:
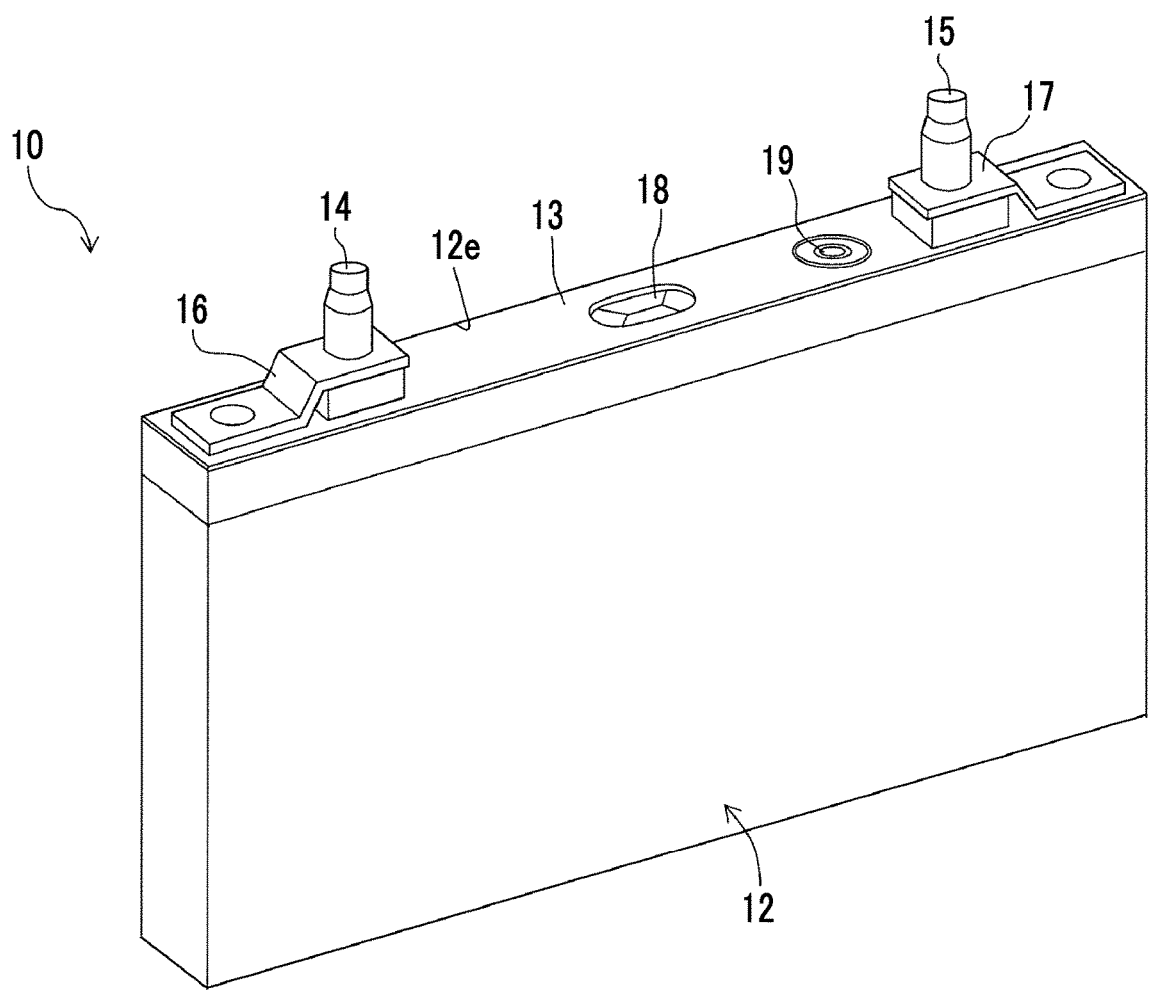
FIG. 1 is a schematic perspective view illustrating the appearance of a secondary battery.

Hereinafter, several embodiments will be described with reference to accompanying drawings. In the drawings referred to below, the same reference numerals will be used to refer to the same or equivalent members.

First Embodiment

Regarding Workpiece

Figure 2:
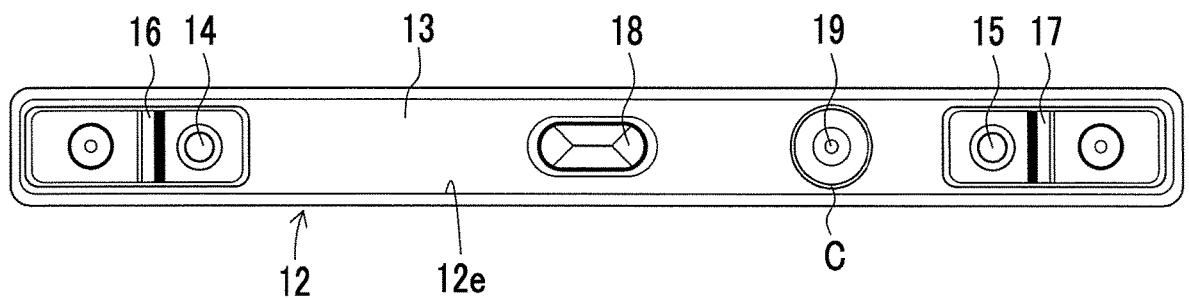
FIG. 2 is a plan view of the secondary battery illustrated in FIG. 1.

FIG. 1 is a schematic perspective view illustrating the appearance of a secondary battery 10. FIG. 2 is a plan view of the secondary battery 10 illustrated in FIG. 1. In the following embodiment, the secondary battery 10 will be described, with reference to FIGS. 1 and 2, as an example of a workpiece that is welded by a laser welding device 100 according to the present embodiment being used.

As illustrated in FIGS. 1 and 2, the secondary battery 10 is a nonaqueous electrolyte secondary battery. For example, a plurality of the secondary batteries 10 is combined in series and is mounted in a hybrid vehicle as an assembled battery. The secondary battery 10 has a battery case 12, a sealing plate 13, a positive electrode terminal 14, and a negative electrode terminal 15. The battery case 12 and the sealing plate 13 constitute an exterior body for accommodating an electrode body and an electrolyte (not illustrated) by being combined with each other.

The battery case 12 is a substantially rectangular parallelepiped-shaped container open in one direction. The battery case 12 has an opening portion 12e. The sealing plate 13 is a rectangular plate-shaped member. The sealing plate 13 is formed in accordance with the size of the opening portion 12e such that the sealing plate 13 blocks the opening portion 12e.

The positive electrode terminal 14 is electrically connected to the positive electrode (not illustrated) of the electrode body via a metal fitting 16. The negative electrode terminal 15 is electrically connected to the negative electrode (not illustrated) of the electrode body via a metal fitting 17. The sealing plate 13 is provided with a safety valve 18 and a lid body 19 as well. The lid body 19 is disposed to cover an opening (not illustrated) for electrolyte injection formed in the sealing plate 13.

The battery case 12, the sealing plate 13, and the lid body 19 are formed of a metallic material such as an aluminum alloy. The battery case 12 and the sealing plate 13 are welded to each other by laser welding at the peripheral edge of the sealing plate 13. The sealing plate 13 and the lid body 19 are welded to each other by laser welding at the peripheral edge of the lid body 19.

Regarding Laser Welding Device 100

Figure 3:
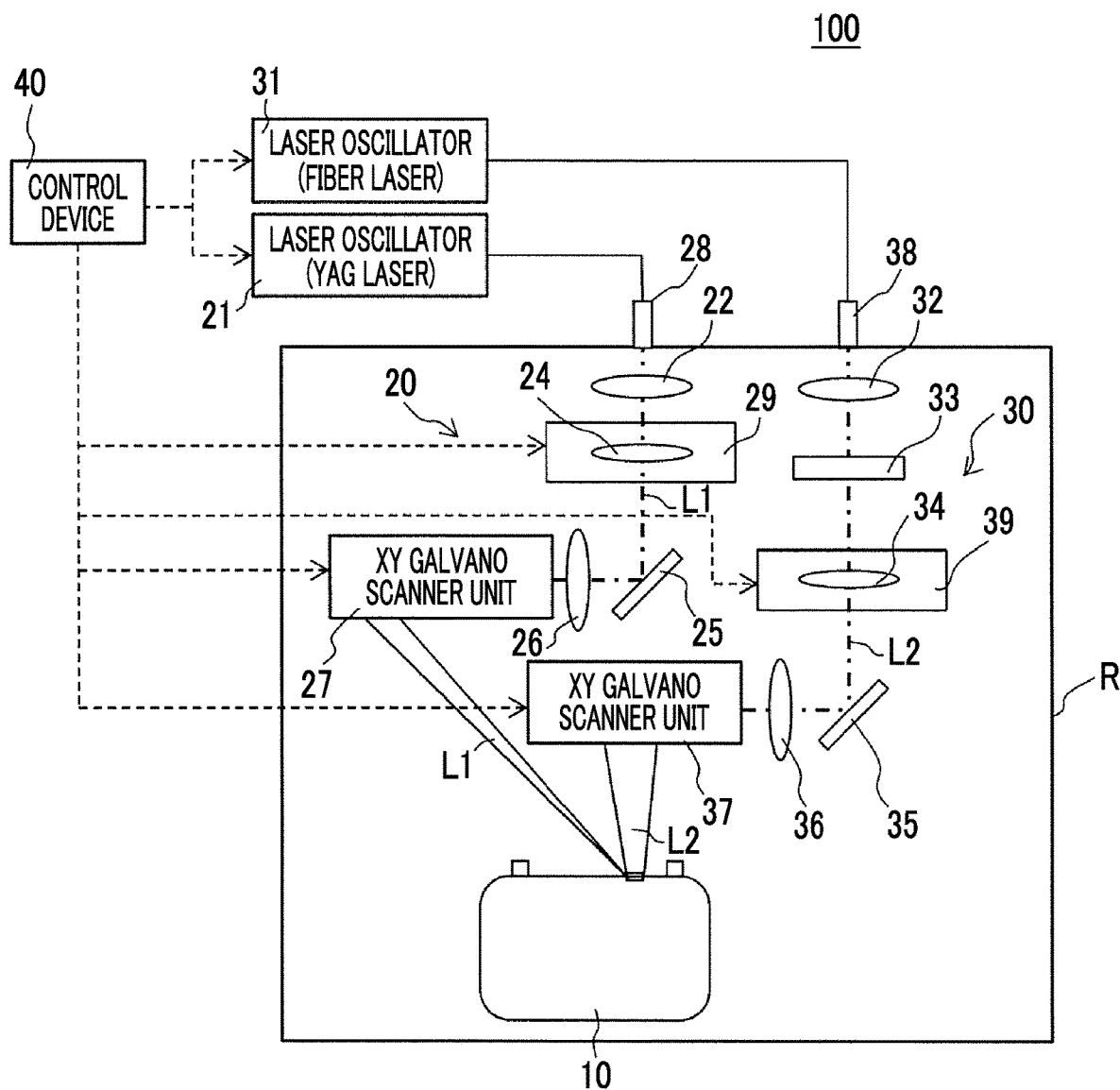
FIG. 3 is a schematic diagram of a laser welding device according to a first embodiment.

FIG. 3 is a schematic diagram of the laser welding device 100 according to the first embodiment. The structure of the laser welding device 100 according to the present embodiment will be described first with reference to FIG. 3. The dashed lines that are shown in FIG. 3 represent signal lines of control signals output from a control device (controller) 40. The one-dot dashed lines that are shown in FIG. 3 represent a laser beam for welding L1, hereafter referred to as a welding laser beam L1, and a laser beam for heating L2, hereafter referred to as a heating laser beam L2.

The laser welding device 100 according to the present embodiment is used when the battery case 12 and the sealing plate 13 are welded to each other and when the sealing plate 13 and the lid body 19 are welded to each other in the manufacturing of the secondary battery 10. In the present embodiment, the configuration of the laser welding device 100 will be briefly described below with the welding between the sealing plate 13 and the lid body 19 used as an example.

The laser welding device 100 is a device that welds the sealing plate 13 and the lid body 19 to each other by emitting (performing scanning with) the welding laser beam L1 along a closed loop-shaped welding path C (refer to FIG. 2) such that the welding laser beam L1 goes around the welding path C. The welding path C is formed at the boundary between the sealing plate 13 and the lid body 19 as two workpieces.

The laser welding device 100 is provided with a first irradiation unit 20 and a second irradiation unit 30. The first irradiation unit 20 performs the scanning with the welding laser beam L1 along the welding path C. The second irradiation unit 30 irradiates the entire welding path C with the heating laser beam L2 such that the entire welding path C is heated. The laser welding device 100 is also provided with the controller 40 that controls the first irradiation unit 20 and the second irradiation unit 30.

The first irradiation unit 20 is provided with at least a laser oscillator 21 emitting the welding laser beam L1 such as a YAG laser, a collimating lens 22, condensing lenses 24, 26, a reflector 25, and an XY galvano scanner unit (hereinafter, referred to as a galvano scanner) 27. The first irradiation unit 20 is also provided with a drive unit 29 that adjusts the irradiation range of the welding laser beam L1 by moving the condensing lens 24 in the Z-axis direction (traveling direction of the welding laser beam L1) based on the control signal of the control device 40.

In the present embodiment, the YAG laser is exemplified as the laser that is emitted by the laser oscillator 21. However, the laser that is emitted by the laser oscillator 21 may also be a solid state laser such as a disc laser, a fiber laser, and a $CO_2$ laser, a gas laser such as a helium neon laser and an argon ion laser, or a semiconductor laser insofar as welding can be performed with the laser. In addition, the welding laser beam L1 may be output on either a pulse basis or a CW basis.

The welding laser beam L1 that is emitted from the laser oscillator 21 is input into a processing chamber R via an optical fiber 28, passes through the collimating lens 22, and is condensed by the condensing lens 24. Then, the welding laser beam L1 is reflected by the reflector 25 and enters the galvano scanner 27 via the condensing lens 26. The galvano scanner 27 is a device for performing scanning with the welding laser beam L1 with speed and positional accuracy. The galvano scanner 27 is a general device and has a pair of galvano mirrors (not illustrated) pivotally supported by a motor (not illustrated). The control device 40 is capable of changing the reflection angles of the galvano mirrors and allowing the scanning with the welding laser beam L1 to be performed along the welding path C by controlling the driving of the motor.

The collimating lens 22 is a lens for turning the welding laser beam L1 entering the galvano scanner 27 into a parallel beam in advance. A condensing lens (not illustrated) is disposed on the output side of the galvano scanner 27. The welding laser beam L1 from the galvano scanner 27 can be condensed on the welding path C by the condensing lens.

The second irradiation unit 30 is provided with at least a laser oscillator 31 emitting the heating laser beam L2 such as a fiber laser, a collimating lens 32, condensing lenses 34, 36, a reflector 35, and an XY galvano scanner unit (hereinafter, referred to as a galvano scanner) 37. As is the case with the first irradiation unit 20, the second irradiation unit 30 is provided with a drive unit 39 that adjusts the irradiation range of the heating laser beam L2 by moving the condensing lens 34 in the Z-axis direction (traveling direction of the heating laser beam L2) based on the control signal of the control device 40. The members of the second irradiation unit 30 in the processing chamber R function similarly to those of the first irradiation unit 20 and, as such, detailed description of the members of the second irradiation unit 30 in the processing chamber R will be omitted herein.

The second irradiation unit 30 is also provided with a diffractive optical element (DOE) 33 between the collimating lens 32 and the condensing lens 34. The diffractive optical element 33 is an element converting the shape of the irradiation region of the heating laser beam L2 by a diffraction phenomenon. Specifically, the diffractive optical element 33 is configured to convert the shape of the irradiation region of the heating laser beam L2 passing through the collimating lens 32 to a ring shape such that the entire welding path C is irradiated with the heating laser beam L2. The heating laser beam L2 passing through the collimating lens 32 becomes a parallel beam in this manner, and the parallel beam enters the diffractive optical element 33. Accordingly, the shape of the irradiation region of the heating laser beam L2 can be converted to the ring shape with a high level of accuracy, and the heating laser beam L2 converted to the ring shape can be efficiently condensed by the condensing lenses 34, 36. In the present embodiment, the heating laser beam L2 is allowed to pass through the diffractive optical element 33 after the heating laser beam L2 passes through the collimating lens 32 as a preferred aspect. However, the heating laser beam L2 may also be allowed to, for example, pass through the collimating lens 32 after passing through the diffractive optical element 33.

The heating laser beam L2 that is emitted from the laser oscillator 31 is input into the processing chamber R via an optical fiber 38, passes through the collimating lens 32, and then passes through the diffractive optical element 33. Then, the heating laser beam L2 is condensed by the condensing lens 34 with the shape of the irradiation region of the heating laser beam L2 converted by the diffractive optical element 33. The condensed heating laser beam L2 is reflected by the reflector 35 and enters the galvano scanner 37 via the condensing lens 36. In the galvano scanner 37, the irradiation region of the heating laser beam L2 is aligned with the welding path C, such that the entire welding path C is irradiated with the heating laser beam L2, by the control device 40 driving a motor (not illustrated) pivotally supported by a pair of galvano mirrors (not illustrated) as in the first irradiation unit 20.

The control device 40 controls the timing of the emission of the welding laser beam L1 by the laser oscillator 21 of the first irradiation unit 20 and the output of the welding laser beam L1 and controls the drive unit 29 and the galvano scanner 27 as described above. Likewise, the control device 40 controls the timing of the emission of the heating laser beam L2 by the laser oscillator 31 of the second irradiation unit 30 and the output of the heating laser beam L2 and controls the drive unit 39 and the galvano scanner 37 as described above. The control device 40 has a program outputting the control signals to these equipment and controlling these equipment for welding to be performed as follows.

Specifically, in the present embodiment, the control device 40 controls the laser oscillator 31 of the second irradiation unit 30 and so on such that the entire welding path C is irradiated with the heating laser beam L2 for a predetermined time. Then, the control device 40 controls the laser oscillator 31 of the second irradiation unit 30 such that the irradiation of the entire welding path C with the heating laser beam L2 continues. At the same time, the control device 40 allows the scanning with the welding laser beam L1 to be performed along the welding path C by controlling the galvano scanner 27 and controls the laser oscillator 21 of the first irradiation unit 20 such that the welding laser beam L1 goes around the welding path C. In the present embodiment, the control device 40 controls the laser oscillator 21 of the first irradiation unit 20 and the laser oscillator 31 of the second irradiation unit 30 such that the irradiation with the welding laser beam L1 and the irradiation with the heating laser beam L2 are terminated after the welding laser beam L1 with which the welding path C is scanned goes around the welding path C.

Regarding Laser Welding Method

FIG. 4 is a timing chart for showing a method for welding by the laser welding device 100 according to the first embodiment. A method for laser welding between the sealing plate 13 and the lid body 19 will be described below. Firstly, the secondary battery 10 is put into the processing chamber R in a state where the lid body 19 is disposed on the sealing plate 13 as illustrated in FIG. 2.

Then, the entire welding path C is irradiated with the heating laser beam L2 for a predetermined time (until time t1 to be specific), as illustrated in FIG. 4, by the control device 40 controlling the second irradiation unit 30. As a result, the entire welding path C is preliminarily heated. Specifically, the control device 40 controls the laser oscillator 31 such that the heating laser beam L2 is emitted and controls the drive unit 39 and the galvano scanner 37 such that the entire welding path C is irradiated with the heating laser beam L2 as described above.

An output (laser intensity) P2 of the heating laser beam L2 is an output at which the material of the lid body 19 and the sealing plate 13 does not melt. Accordingly, during the preliminary heating, the material has a temperature equal to or less than its melting point. Preferably, the duration of the preliminary heating (from time 0 to time t1) is one during which the amount of the heat input by the heating laser beam L2 and the amount of the heat dissipation of the input heat from the secondary battery 10 remain balanced with each other, that is, one during which the temperature of the welding path C is stable (constant) regardless of the duration of the irradiation. As a result, the penetration depth of a welded part W resulting from the welding laser beam L1 with which the welding path C is scanned can be further stabilized.

After the preliminary heating (after time t1), scanning with the welding laser beam L1 is performed along the welding path C and the welding laser beam L1 is allowed to go along the welding path C while the irradiation with the heating laser beam L2 is allowed to continue by the control device 40.

Specifically, the first irradiation unit 20 is controlled as follows by the control device 40 while the state of the irradiation with the heating laser beam L2 by the second irradiation unit 30 following the preliminary heating is maintained. Specifically, the control device 40 performs control such that the welding laser beam L1 is emitted from the laser oscillator 21, allows the scanning with the welding laser beam L1 to be performed along the welding path C, and controls the drive unit 29 and the galvano scanner 27 such that the welding laser beam L1 goes around the welding path C (time t1 to time t2).

In the present embodiment, the control device 40 controls the laser oscillators 21, 31 such that the irradiation with the welding laser beam L1 and the irradiation with the heating laser beam L2 are terminated after the welding laser beam L1 goes around the welding path C.

In the present embodiment, the entire welding path C is preliminarily heated by the heating laser beam L2 and the irradiation with the heating laser beam L2 continues even after the preliminary heating. As a result, the lid body 19 and the sealing plate 13 can be welded to each other by the welding laser beam L1 at a lower output than in a case where the heating laser beam L2 is not emitted. Accordingly, a rise in temperature at the part of the welding path C welded after the preliminary heating attributable to the heat input from the welding laser beam L1 with which the welding path C is scanned can be further reduced.

As a result, in the present embodiment, the temperature difference between a welding initiation part S and a welding termination part E of the welding path C can be further reduced during the welding even without complex output control being performed on the welding laser beam L1. Accordingly, the uniformity of the penetration depth of the welded part W formed along the welding path C can be increased. In the present embodiment, an output P1 of the welding laser beam L1 and the output P2 of the heating laser beam L2 are constant. However, the outputs P1, P2 may also be slightly controlled insofar as, for example, the penetration depth becomes uniform.

Second Embodiment

FIG. 5 is a timing chart for showing a method for welding by a laser welding device 100 according to a second embodiment. The laser welding device 100 according to the second embodiment differs from that according to the first embodiment in terms of control of a second irradiation unit 30 by a control device 40.

Specifically, the control device 40 performs the control according to the first embodiment and additionally controls the second irradiation unit 30 such that a heating laser beam L2 is continuously emitted for a predetermined time after irradiation with a welding laser beam L1 is terminated.

More specifically, in the present embodiment, the control device 40 terminates the irradiation with the welding laser beam L1 at a timing (time t2) when the welding laser beam L1 with which the welding path C is scanned goes around a welding path C as illustrated in FIG. 5. The heating laser beam L2 continuously heats the entire welding path C until time t3.

In the present embodiment, a welded part W as a whole is uniformly heated and then cooled, with the above-described effect of the first embodiment maintained, as the emission of the heating laser beam L2 continues for a predetermined time even after the termination of the welding by the welding laser beam L1. As a result, a variation in the solidification rate of the entire welded part W can be further suppressed and the textural uniformity of the welded part W can be increased.

Third Embodiment

FIG. 6 is a timing chart for showing a method for welding by a laser welding device 100 according to a third embodiment. FIG. 7 is a timing chart for showing a method for welding by the laser welding device 100 according to a modification example of the third embodiment.

The laser welding device 100 according to the third embodiment differs from that according to the second embodiment in that a control device 40 controls a second irradiation unit 30 such that the output of a heating laser beam L2 continuously emitted after irradiation with a welding laser beam L1 is terminated is decreased to a constant output.

Specifically, in the present embodiment, the control device 40 terminates the irradiation with the welding laser beam L1 at a timing (time t2) when the welding laser beam L1 goes around a welding path C as illustrated in FIG. 6. The heating laser beam L2 continuously heats the entire welding path C until time t3. At this time, the output of the heating laser beam L2 that is emitted after time t3 is decreased to a constant output with respect to the output of the heating laser beam L2 that is emitted before time t3.

In the present embodiment, the temperature of a welded part W can be lowered in stages, with the above-described effect of the second embodiment maintained, as the output of the heating laser beam L2 is decreased to a constant output. As a result, the welded part W can be gradually solidified, outgas sing of the welded part W can be improved, and void generation at the welded part W can be further suppressed.

According to FIG. 6, the output of the heating laser beam L2 that is emitted after time t3 is decreased to a constant output with respect to the output of the heating laser beam L2 that is emitted before time t3. However, the output of the heating laser beam L2 that is emitted after time t3 may also be monotonically decreased as exemplified in FIG. 7. The output of the heating laser beam L2 that is emitted after time t3 may be decreased in a stepwise manner as well.

Although embodiments have been described above, the specific configuration is not limited to the embodiments and examples described above. Any change in design not departing from the scope of the disclosure is included in the disclosure.

What is claimed is:

1. A laser welding method comprising:
   preliminarily heating an entire welding path by irradiating the entire welding path with a heating laser beam for a first predetermined time, the welding path being closed loop-shaped and formed at a boundary between two workpieces as welding objects;
   performing scanning with a welding laser beam along the welding path while continuously performing the irradiation with the heating laser beam after the preliminary heating and terminating the irradiation with the welding laser beam after the welding laser beam goes around the welding path; and
   continuously emitting the heating laser beam for a second predetermined time after the irradiation with the welding laser beam is terminated.

2. The laser welding method according to claim 1, wherein an output of the heating laser beam continuously emitted after termination of the irradiation with the welding laser beam is decreased.

3. The laser welding method according to claim 2, wherein the output of the heating laser beam continuously emitted after termination of the irradiation with the welding laser beam is decreased by a constant output with respect to an output of the heating laser beam emitted before the irradiation with the welding laser beam is terminated.

4. The laser welding method according to claim 2, wherein the output of the heating laser beam continuously emitted after termination of the irradiation with the welding laser is decreased at a predetermined constant rate of decrease with respect to an output of the heating laser beam emitted before the irradiation with the welding laser beam is terminated.

5. A laser welding device comprising:
   a first irradiation unit configured to emit a welding laser beam along a closed loop-shaped welding path formed at a boundary between two workpieces as welding objects;
   a second irradiation unit configured to irradiate an entire welding path with a heating laser beam such that the entire welding path is heated; and
   a controller configured to control the first irradiation unit and the second irradiation unit,
   wherein the controller is configured to control the second irradiation unit such that the entire welding path is irradiated with the heating laser beam for a first predetermined time and then control the first irradiation unit, while controlling the second irradiation unit such that the irradiation with the heating laser beam continues, such that scanning with the welding laser beam is performed along the welding path and the irradiation with the welding laser beam is terminated after the welding laser beam goes along the welding path, and
   wherein the controller is configured to control the second irradiation unit such that the heating laser beam is continuously emitted for a second predetermined time after the irradiation with the welding laser beam is terminated.

6. The laser welding device according to claim 5, wherein the controller is configured to control the second irradiation unit such that an output of the heating laser beam continuously emitted after termination of the irradiation with the welding laser beam is decreased.

* * * * *